INVENTOR.
FRANK W. KNOWLES
BY
Robert W. Beach
ATTORNEY

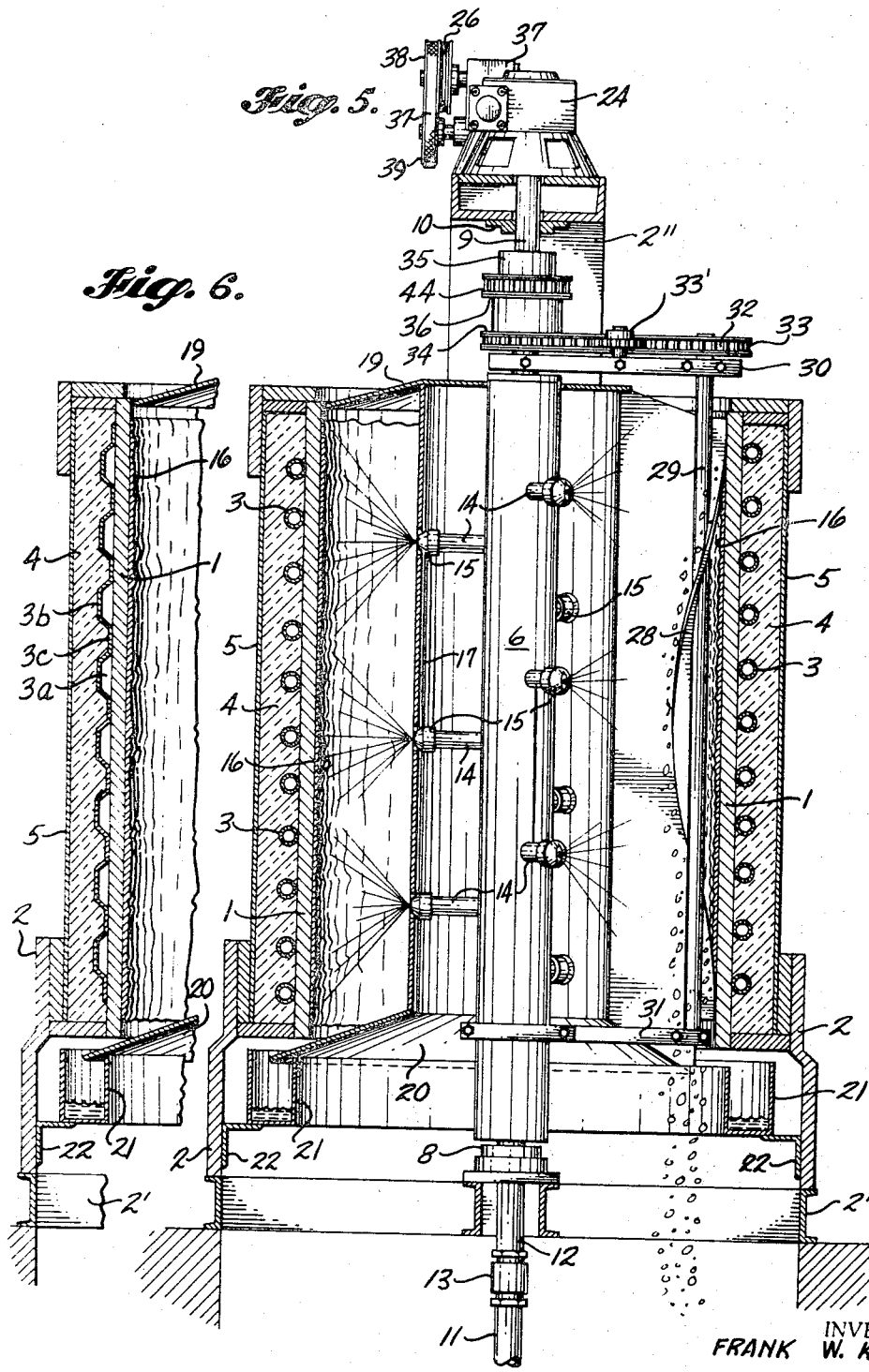

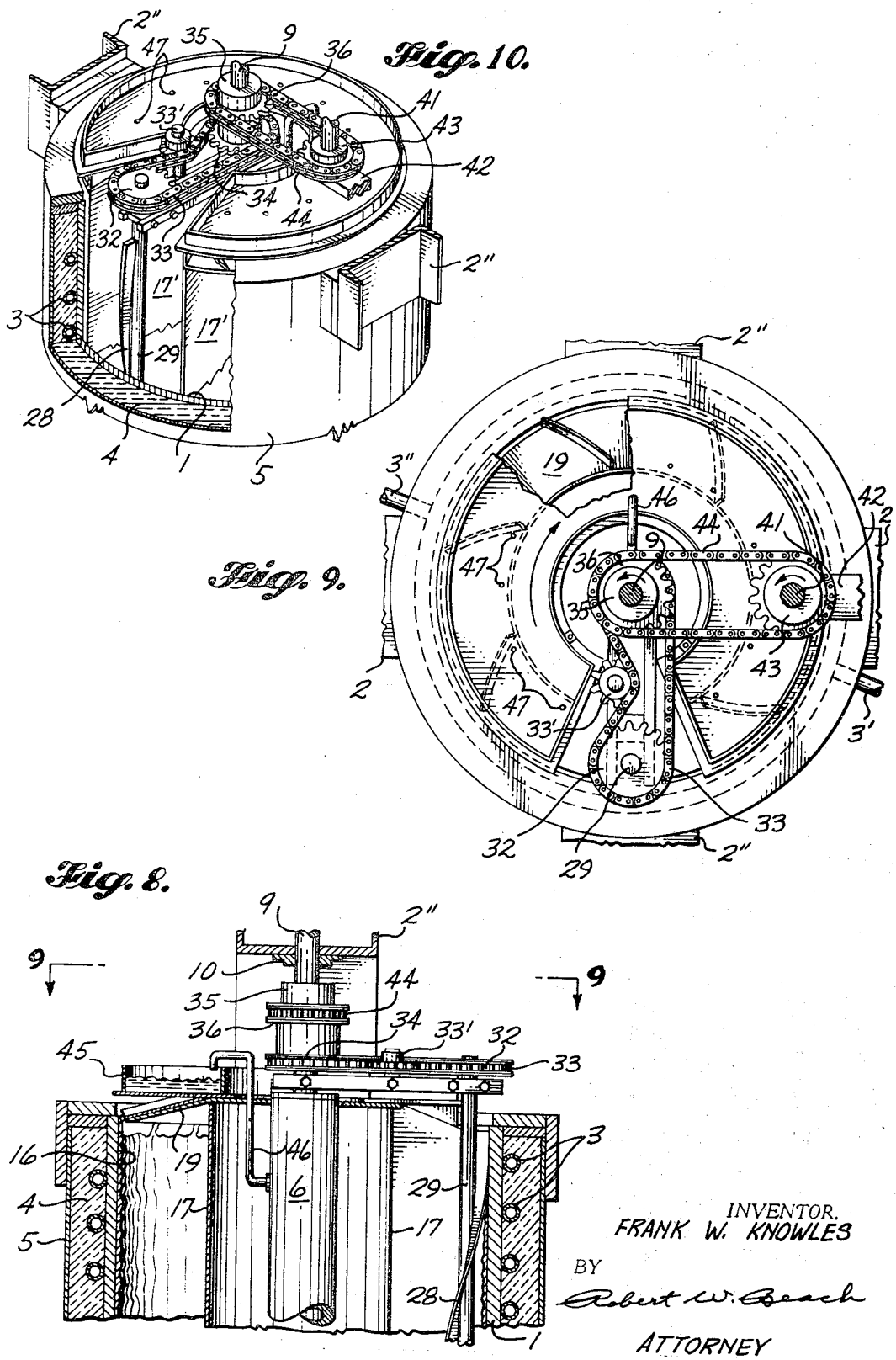

United States Patent Office 3,403,532
Patented Oct. 1, 1968

3,403,532
FLAKE ICE-MAKING MACHINE
Frank W. Knowles, 2021 S. Alaska,
Seattle, Wash. 98108
Continuation-in-part of application Ser. No. 489,288,
Sept. 22, 1965. This application Dec. 1, 1966, Ser.
No. 598,472
9 Claims. (Cl. 62—347)

ABSTRACT OF THE DISCLOSURE

Water jets directed radially outward spray water on the interior wall of a hollow cylinder having its axis upright, which wall is cooled by an encircling refrigerating coil. The jet nozzles are offset circumferentially and axially of a rotary pipe and project sprays through apertures in a cylindrically arcuate partition concentric with the axis of the freezing surface. A rotor is mounted between radial extensions of the partition, which rotor has a helical blade for scraping ice off the freezing surface. Mounting structure is provided for the jet nozzles, the partition and the ice-removing rotor and is rotated slowly about the axis of the freezing surface, and the ice-removing rotor is rotated relative to the mounting structure in the opposite direction at a speed such that the periphery of the rotor moves along the freezing surface in the direction opposite to the direction of translation of the rotor relative to the freezing surface to scrape ice from it. Sprays from the nozzles may be projected only onto the lower portion of the freezing surface, and water may flow from a trough above the freezing surface down onto its upper portion.

---

This application is a continuation-in-part of my U.S. patent application 489,288, filed Sept. 22, 1965, for Flake Ice-Making Machine, now abandoned. This invention relates to a machine for making flake ice and particularly to such a machine by which ice is made in a thin film on a freezing surface by stripping or scouring the film from such surface in small pieces.

It is a general object of the present invention to provide a machine for manufacturing such flake ice quickly and economically in large quantities without requiring attention by an operator.

More specifically, it is an object to provide a machine which can supply water effectively to a freezing surface to be frozen, and which will enable any unfrozen water to be drained off without mixing with ice that has been formed on and removed from the freezing surface.

In such an ice-making machine it is an object to shield the mechanism for stripping the ice from the water-depositing mechanism so that ice will not form on the stripping mechanism, which would cause it to lose efficiency or would necessitate periodic cleaning.

A further object is to protect the atmosphere surrounding the ice-making machine from excessive humidification and to confine the water supplied for making ice within a substantially closed chamber.

It is also an object to provide such an ice-making machine which can be operated satisfactorily in a room which need not be kept at substantially freezing temperatures.

An additional object is to provide such an ice-making machine in which all of the moving parts having close tolerances are located outside of the freezing zone so that they will not be subjected to accumulation of ice on them.

Another object is to provide such an ice-making machine which will have a high ice production capacity for its size.

An object is to provide such a machine which is economical to manufacture, rugged in construction and which will require a minimum of upkeep.

The foregoing objects can be accomplished by a machine for making flake ice having a cylindrically concave freezing surface onto which water to be frozen is deposited in successive layers at least partially by nozzles in the form of a fine spray or mist, so that the water will freeze to the freezing surface, or to a layer of ice on such surface, almost instantaneously and in the form of a coating or film of substantially uniform thickness. The upper part of such coating can be deposited from a film of water running down from the upper edge of the wall. Excess water deposited on the freezing surface which fails to freeze is collected in a trough separate from the ice-stripping chamber so that the water does not deteriorate the ice.

The ice film or coating can be stripped or scoured from the freezing surface by a rotary helical vane which is rotated while it is being pressed against the ice coating. Such rotary vane and the nozzles are mounted for conjoint rotation relative to the freezing surface circumferentially of it about the axis of the cylindrical freezing surface with the stripping rotor axis offset from the axis of the freezing surface cylinder. Such stripping rotor is also rotated about its own axis so that the periphery of the vane moves in the direction opposite the direction of orbital travel of the stripping rotor around the axis of the freezing surface. Common drive mechanism can be used both to turn the stripping rotor about its own axis and to move such stripping rotor orbitally about the axis of the freezing surface cylinder.

A shielding partition located around the ice-stripping rotary vane separates it from the water-depositing zone of the hollow cylinder. Such vane and its supporting mechanism are thus protected from spray from the nozzles so that an ice deposit will not accumulate on them, and the partition will form an ice-removing chamber separated from the water spray chamber.

FIGURE 5 is a longitudinal vertical section through the machine taken perpendicular to the longitudinal section portion of FIGURE 2.

FIGURE 6 is a fragmentary longitudinal vertical section through the edge portion of a machine having a modified structure.

FIGURE 8 is a fragmentary longitudinal vertical section through the upper portion of the machine shown in FIGURE 7, taken perpendicular to that figure to correspond to FIGURE 5.

FIGURE 9 is a horizontal section through the machine of FIGURES 7 and 8, taken along line 9—9 of FIGURE 8 with parts broken away.

FIGURE 10 is a top perspective of the upper portion of the machine shown in FIGURES 7, 8 and 9, having parts broken away.

Figure 1:
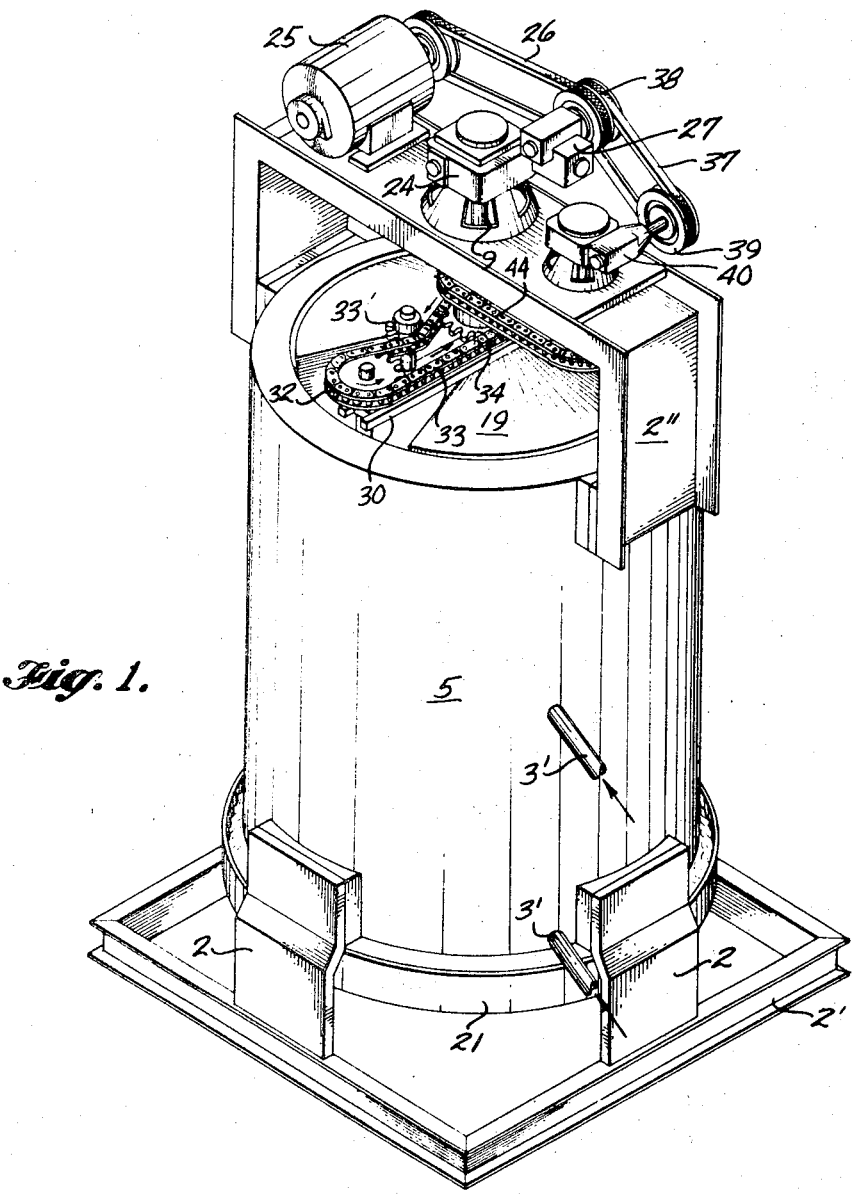
FIGURE 1 is a top perspective of the flake ice-making machine.

The ice-making machine of the present invention is of compact unit construction which can be installed in any desired location and prepared for operation simply by connecting to the machine electric wires to supply electricity, a conduit by which water is supplied, connections for supply and discharge of refrigerant, a drain for excess water and any desired arrangement for collecting and removing to suitable storage facilities ice which is formed. The heart of the machine is a cylindrically concave annular wall 1 forming a freezing surface. This cylinder is supported by legs 2 from a base 2', which may be of open square shape, as shown in FIGURE 1, and can be made of channel iron. On the upper end of the cylindrical wall is mounted a bridge 2" from which internal mechanism of the machine is supported.

The wall 1 is cooled to a temperature sufficiently low so that a film or fine spray of water deposited on the freezing surface will be turned into ice immediately by refrigerant circulated through cooling coils 3 which are wrapped around the freezing surface cylinder 1 in heat-conducting relationship to it. Such coils can be of helical shape or they can include circular components connected by a header and such coils can include any number of sections. In the coil arrangements shown in FIGURES 2 and 4, in particular, the cooling coils are of helical conformation and are formed in two sections, one encircling the upper portion of the freezing wall cylinder and the other encircling the lower portion of the freezing wall cylinder. Any suitable refrigerant is supplied to these coil sections by supply connections 3 and discharged from such sections by discharge connections 3", shown particularly in FIGURES 3 and 4.

In order to increase the cooling efficiency of the refrigerant and enable the machine to be installed effectively in a room which is not kept at freezing temperature, the exterior of the freezing wall cylinder can be covered with thermal insulation 4 in which the cooling coils 3 are embedded. Such insulation can be of the cellular plastic foam type, or can be mineral fiber bat, such as rock wool or glass wool, for example. Such insulation can be confined within a thin outer shell 5 to protect the insulation.

The mechanism provided to deposit water on the concave freezing surface of the wall 1 includes a central header tube 6 having a bore 7, the opposite ends of which are covered by suitable caps. The lower cap has a projection which fits within a radial bearing collar 8 relative to which the projection of the cap is sealed by packing such as a rubber O-ring, providing a rotatable joint. A shaft 9 extends upward from the upper cap through a suitable bearing and support 10, by which such shaft, and consequently tube 6, are suspended from the supporting bridge 2" in a position concentric with the freezing surface wall 1.

A flexible water supply pipe 11 is connected to a nipple 12 by a suitable coupling 13. Such nipple is screwed into the lower end of the bearing collar 8 so as to communicate with the internal bore 7 of tube 6 through a passage in the cap closing the lower end of such tube. Water is discharged from the bore 7 serving as a header through a number of discharge pipes 14 extending generally radially of tube 6 and cylindrical wall 1, and having nozzles 15 on their radially outer ends.

While the particular number and arrangement of the discharge pipes and spray nozzles can vary, FIGURES 2 to 5 show them arranged in three vertical rows spaced apart circumferentially of the tube 6 by angles of 120° with three pipes being provided in each row. The pipes in the three rows are staggered lengthwise of the header tube 6 so that each nozzle sweeps only one particular zone of the concave freezing surface. Additionally, the nozzles preferably are of the type which project fan-shaped substantially flat sprays and such nozzles are arranged so that the sprays are disposed substantially parallel to vertical radial planes. Moreover, the discharge pipes and nozzles are located sufficiently close together so that the edges of adjacent flaring sprays in each row substantially meet at the freezing surface.

It is preferred that the nozzles 15 be of a type which will atomize the water discharged from them so that it will be deposited on the freezing surface of wall 1 as a mist or fine spray. In order to enable such mist or spray to be deposited effectively on the freezing surface, while being distributed over a reasonably wide area, the pipes 14 project a substantial distance from the central header tube 6 to locate the nozzles reasonably close to the freezing surface, but not too close to it. Ordinarily, such nozzles will be located approximately half way between the axis of the cylindrical wall 1 and the inner surface of the wall. The radius of the freezing surface may, for example, be from one to three feet. If the nozzles 15 were located midway between the axis of the cylindrical wall and such wall, such nozzles would then be spaced from six inches to eighteen inches from the freezing surface. The important consideration is that the nozzles deposit the water on the surface of the wall itself, or on a layer or film of ice already frozen on the wall, in a thin, even layer which will be frozen virtually instantaneously.

Figure 4:
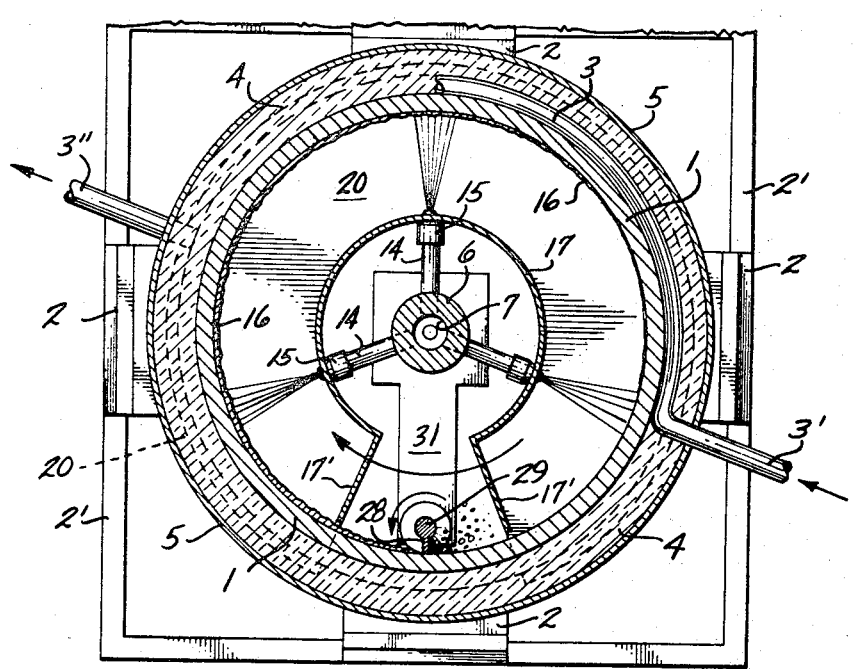
FIGURE 4 is a horizontal section through the machine taken on line 4—4 of FIGURE 2.
Figure 7:
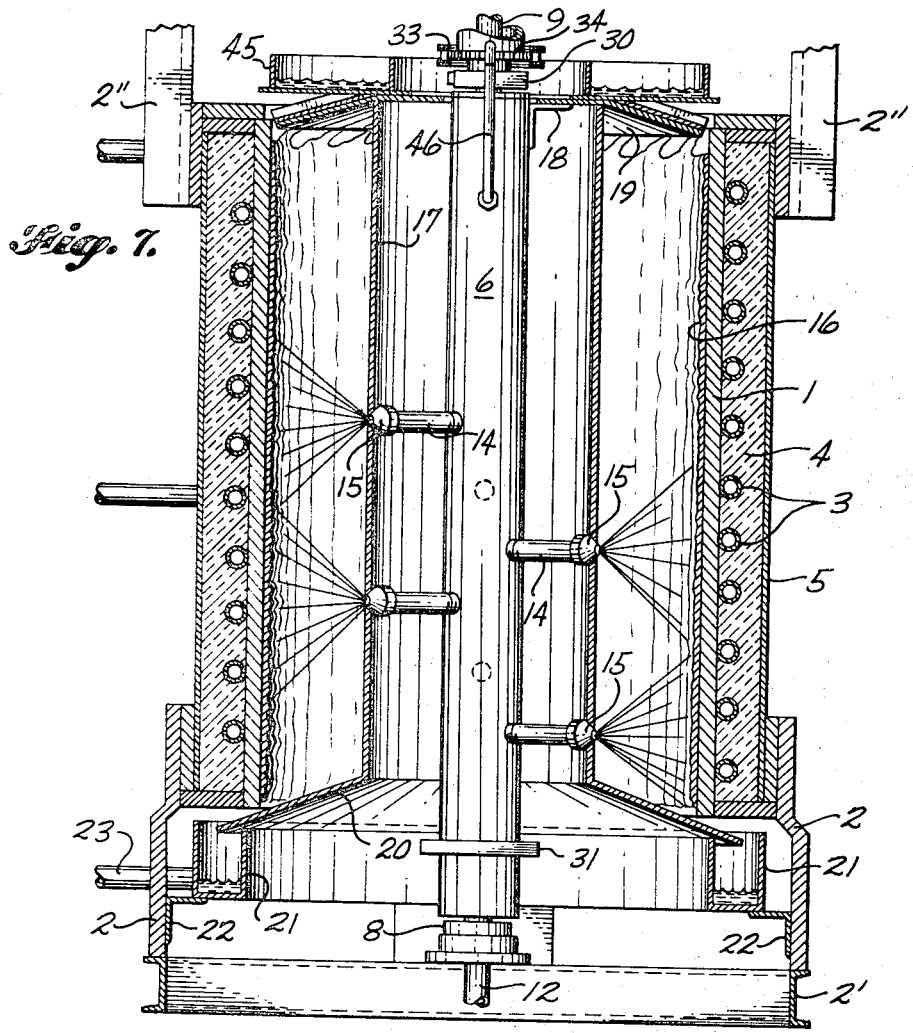
FIGURE 7 is a longitudinal vertical section generally similar to FIGURE 2, showing a modified type of machine.

With the nozzle arrangement shown in the drawings the nozzle at the right of FIGURE 4 would deposit a film of water directly on the concave freezing surface of the cylindrical wall 1. The nozzle at the upper side of this figure would deposit a film of water on the first layer of ice 16 and this film would freeze to form a second layer. As the nozzle at the left of this figure moves into registry with the same portion of the wall surface, it will deposit a further film of water on such second layer of ice, which will freeze to provide a third layer. Actually, such layers are so thin that the final ice coating 16 will still be quite thin, such as being of the order of $\frac{1}{16}''$ thick. When such a coating of ice is sheared from the freezing surface, it will break up into reasonably small flakes.

Between the central header tube 6 and the freezing surface cylinder 1 is a shielding partition wall 17, which preferably is of substantially keyhole horizontal cross section, as shown in FIGURE 4. The arcuate portion of such partition is preferably of circular arcuate shape having a radius approximately equal to the distance between the axis of the cylindrical wall 1 and the tips of the nozzles 15, as shown best in FIGURE 4. The arcuate extent of such partition may be in excess of 300°. From the ends of such arcuate section wings 17' extend radially outward substantially to the freezing surface of the wall 1. Such partition rotates with the central header tube 6, and consequently the outer edge of the wing 17' which leads in the direction of rotation of the partition must be spaced from the freezing surface of the wall 1 at a distance sufficient to clear the layer of ice 16 which accumulates on the freezing surface.

The shielding partition 17 is supported for rotation from the central tube 6. Angle brackets 18 secured to the upper end of such tube carry an upper end wall 19, shown in FIGURE 2, which bridges the space between the arcuate portion of the partition 17 and the wall 1. A frustoconical skirt 20 slopes downward and outward from the lower edge of the arcuate portion 17 of the partition, as shown best in FIGURES 2 and 5. The inner edge of this skirt is secured to the lower edge of the partition portion 17 and slopes downwardly and outwardly from such partition below the lower end of the wall 1. The outer edge of such skirt overhangs a stationary water-collecting trough 21.

Thus, the spray discharged from the nozzles 15 is confined to the spray chamber formed between the upright partition 17, 17', the roof 19, the wall 1 and the skirt 20. Any droplets of water which fall before they impinge against the freezing surface of the wall 1, or the ice accumlated on it, and any water deposited on the freezing surface which runs down to the lower edge of wall 1 before it is frozen, will fall onto the skirt 20. Since this skirt slopes outwardly and downwardly water falling on it will run outward and downward into the annualr collecting trough 21 supported concentrically with the freezing surface wall 1 by brackets 22 secured to the legs 2.

From such trough water will drain out of the discharge pipe 23. Since the trough 21 is concentric with the wall 1, the axis of rotation of the tube 6, the partition 17, 17' and the skirt 20, such skirt and the trough will maintain a concentric relationshp in all rotative positions of the skirt relative to the trough.

Rotation of tube 6, the water discharge pipes 14 and the partition 17 is effected by the drive mechanism 24 mounted on the bridge 2''. Such drive is powered by the electric motor 25 driving the V-belt 26 which turns the speed-reducing worm and gear drive 27. Thus, the drive 24, 27 may incorporate a double worm and gear drive which will effect very slow rotation of tube 6 about its axis. Rotation of such tube will also effect orbital rotation about the axis of such tube of an ice-shearing rotor including a helical blade 28 convoluted at a steep pitch around the rotor shaft 29, which is shown in FIGURES 4 and 5. As indicated by the arrows in FIGURE 4, not only does the rotor travel orbitally around the axis of tube 6, but it is rotated about its own axis in the opposite direction to shear, or scrape, from the freezing wall ice coating 16 which has collected on the freezing surface.

Figure 2:
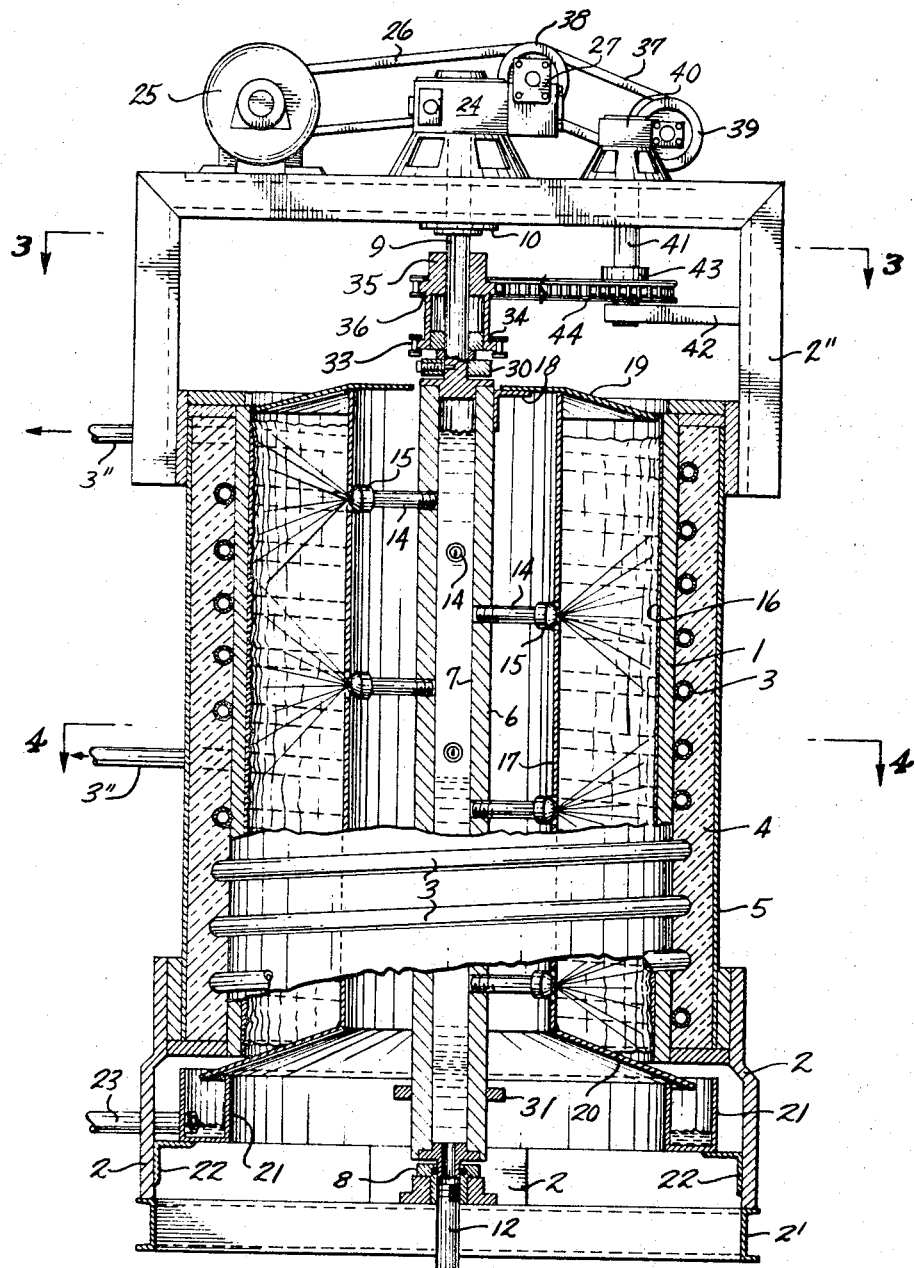
FIGURE 2 is a side elevation with parts broken away principally to provide a longitudinal vertical section through the machine.
Figure 3:
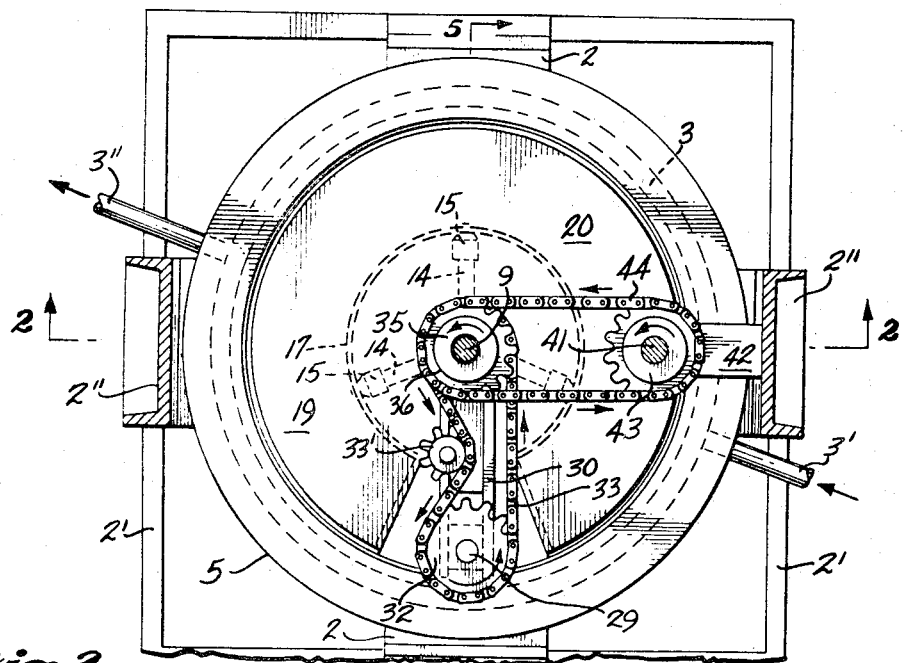
FIGURE 3 is a horizontal section through the machine taken on line 3—3 of FIGURE 2

The ice-removing rotor shaft 29 extends between an upper mounting arm 30, shown in FIGURES 1, 3 and 5, and a lower mounting arm 31, in which arms end portions of the rotor shaft are journaled. These arms are mounted in turn in any suitable fashion on the upper and lower portions of the header tube assembly. In FIGURE 2 the arm 30 is shown as being mounted on the upper stub shaft 9 and the arm 31 is shown as being secured directly to the tube 6. The upper end of shaft 29 extends upwardly through the upper arm 30 sufficiently to enable a sprocket 32 to be secured to such shaft end, as shown in FIGURE 5. Endless chain 33 is engaged with this sprocket and with sprocket 34 on the lower end of a sprocket body 35 having a further sprocket 36 located above sprocket 34.

Rotation of the sprocket body 35 in the manner indicated by the arrows in FIGURE 3 will cause sprocket 34 to drive chain 33, tightened by the chain tightener sprocket 33', to rotate sprocket 32 for turning the shaft 29 of the ice-removing rotor as the tube 6 is turned. For this purpose it will be evident that the sprocket body 35 is rotatively mounted on stub shaft 9 for rotation relative to it. Such rotation can be effected by the same motor 25 that turns such shaft by providing a further drive belt 37, shown in FIGURES 1 and 2, which connects pulley 38 driven by belt 26 and pulley 39 which is mounted on a shaft of a speed reducer 40. This speed reducer also may be of the worm and gear type.

The output shaft 41 from the speed reducer has its lower end journaled in a bracket 42 carried by bridge 2'' as shown in FIGURE 2. A sprocket 43 is keyed to shaft 41 and drives chain 44, which in turn drives sprocket 36 on the sprocket body 35. The speed of shaft 41 can be quite slow because the speed of rotation of rotor shaft 29 about its axis should be such that the helical b'ade 28 will make one complete revolution during orbital movement of the rotor through a circumferential distance of approximately 1¼ inches. The rotary speed of shaft 29 will, however, be much greater than the rotational speed of tube 6.

As the tube 6 rotates in the direction indicated by the arrow in FIGURE 4, the nozzles 15 on the ends of radial pipes 14 carried by such tube will be supplied with water to deposit successive films on the freezing surface of cylindrical wall 1, or on ice 16 accumulated on it, which will freeze almost instantly. As seen in this figure, however, the radial partition walls 17' protect the rotor 28, 29 from such spray. Rotation of this rotor will scour the ice layer progressively from the freezing surface in the form of flakes, as indicated in FIGURES 4 and 5. Such flakes will be confined within the rotor chamber by the radial walls 17', and since the space between these walls does not have a bottom corresponding to the element 20, the ice flakes will drop down through the base 2', as shown in FIGURE 5, into any suitable collecting bin or other receiver.

In the flake ice-making machine shown in FIGURES 1 to 5, the freezing surface of the wall 1 is chilled by refrigerant circulated in the coils 3, as described. In FIGURE 6 an alternate form of refrigerant circulating structure is shown. In this instance, instead of the refrigerant being circulated in a coil, a helical refrigerant passage 3a is formed by a generally cylindrical corrugated sheet wrapped around the wall 1. Such sheet has bands 3b spaced from the wall 1 alternating with bands 3c, which engage the outer surface of the wall 1 contiguously. Suitable refrigerant supply and discharge connections will be provided for the refrigerant passage comparable to the connections 3' and 3'' shown in FIGURES 3 and 4.

Because of the fineness of the spray projected from the nozzles 15, it has been found that fine spray tends to escape out through the top of the cylinder between the upper end of the stationary freezing surface 1 and the upper end wall 19. Particularly if the machine is in a cold room, such spray may freeze on portions of the machine above the freezing surface. Also, because droplets striking the freezing surface 1 tend to run downward to a greater or lesser extent before they are immobilized, the final coating of ice which is formed on the upper portion of the freezing wall 1 may not be as thick as the coating on the lower portions of the surface. To the extent that that the layer of ice is thinner, the ice making capacity of the machine is reduced.

In the machine shown in FIGURES 7 to 11, the amount of fine spray in the upper portion of the ice making chamber is reduced, while at the same time the thickness of the ice coating frozen on the upper portion of the freezing surface is increased. This result is accomplished by substituting a descending film of water over the upper portion of the freezing surface instead of applying the water to this portion of the freezing surface by the upper sprays 15, shown in FIGURES 2 and 5. Each vertical row of pipes 14 and nozzles 15 shown in FIGURES 2 and 5 include three pipes and nozzles. In the machine shown in FIGURES 7 to 10, the upper pipe 14 and nozzle 15 of each vertical row of pipes and nozzles has simply been omitted. Consequently, the application of spray to the freezing surface of wall 1 occurs over the lower 70% to 75% of the height of the wall, instead of nearly 100% of such height.

The construction of the freezer shown in FIGURES 7 to 10, inclusive, is generally the same as the construction shown in FIGURES 1 to 5, inclusive, and the parts of this freezer have been designated by the same numbers. Consequently, it is not necessary to repeat the description of the structure of the machine with the exception of the construction relating to the water distribution onto the freezing wall 1. Moreover, the water for projection from the nozzles 15 is supplied through the central tube 6 and the radial pipes 14 from the supply pipe connected to the bottom of the tube by the nipple 12 as described previously. In this instance, the upper end wall 19 of the freezing space which is mounted on the arcuate partition 17 carries the upper water distribution mechanism. Such mechanism includes an annular tray 45 substantially coextensive with the space between the arcuate partition 17 and the freezing surface 1. Water is supplied to this tray through a pipe 46 shown in FIGURES 7, 8 and 9, which extends upward from and is connected to the central tube 6. Water is discharged from the bottom of this tray through small perforations 47 shown best in FIGURES 9, 10 and 11.

Figure 11:
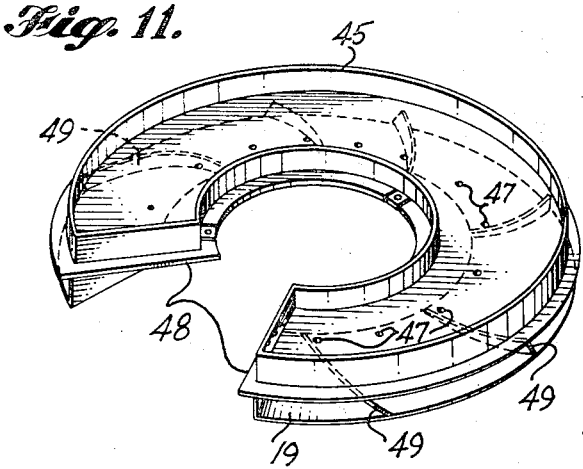
FIGURE 11 is a top perspective of a water distribution tray component of the machine shown in FIGURES 7 to 10.

It will be seen from FIGURE 11 that the tray 45 and the upper end wall 19 can be formed as a unitary structure, having the same arcuate extent as the partition 17. Such tray has a gap 48 corresponding to the circumferential gap between the two radial walls 17', as shown best in FIGURE 10. Between the upper end wall 19 and the bottom of the tray 45 are vanes 49 which extend generally radially, but preferably are somewhat curved, as shown in FIGURES 9 and 11 in particular. Also, it is preferred that the vanes be inclined so that the inner end of the vane leads the outer end in the direction of rotation of the partition 17, the cover 19, and the tray 45. The purpose of these vanes is to direct the water so that as the water passes off the rotating cover it will not be rotating appreciably relative to the frezing wall 1, and consequently can move directly down the wall.

As water is supplied from pipe 46 to the tray 45, it will be distributed around the tray so as to be of approximately equal depth in all portions of the tray. The water will then drain slowly through the holes 47 in the bottom of the tray into the compartments of the freezing chamber cover between the vanes 49. The holes 47 are located so that the water is fairly evenly distributed in each of these compartments. Since the cover 19 slopes downwardly and outwardly, the water will move toward the circumference of the cover in the form of a thin sheet which will be of progressively less depth toward the circumference of the cover because of the increase in circumferential width of the compartments between the vanes toward the circumference of the cover. Consequently, the water will be discharged as a sheet from the periphery of the cover and will flow as a film onto the freezing wall 1, or any coating of ice which may have frozen on it. The film of water thus deposited on the freezing wall will tend to flow down the wall, but it will be thin enough so that portions of it will freeze progressively as the film passes down the hall.

By applying water to the upper portion of the freezing wall 1 in the form of a sheet or film, instead of as a spray, occurrence of mist floating in the upper portion of the freezing chamber is minimized and, consequently, little moisture escapes from the freezing chamber between the rotating edge of cover 19 and the freezing wall. Any mist which tends to escape through this opening must pass through water flowing from the upper side of the cover 19 onto the upper portion of the freezing wall and such water will tend to trap this mist. The wall 1 should be sufficiently cold so that all of the water flowing from the cover onto the upper edge of the wall will have become frozen by the time the film of water moves down to the area of the wall against which the sprays from nozzles 15 are projected. Such sprays will then coat the lower portion of the wall, so that by the combination of the flow-deposited film at the top of the wall and the sprays from the nozzles 15 impinging the lower portion of the wall, thin layers of ice will accumulate substantially uniformly over the wall from top to bottom as the water-distributing rotor rotates.

Following freezing of the ice coating in layers on the freezing surface 1, such coating will be removed from the surface in the form of flakes by the helical blade 28 carried by shaft 9, in the manner described above.

I claim:

1. A flake ice-making machine comprising a cylindrically concave freezing surface, water supply means for depositing water on said freezing surface for formation of ice thereon, an ice-removing rotor, rotary mounting means rotatable about the axis of said freezing surface and supporting said water supply means and said ice-removing rotor for orbital rotation relative to said freezing surface with said rotor located adjacent to said freezing surface, and drive means for rotating said mounting means about the axis of said freezing surface and for rotating said rotor about its own axis relative to said rotary mounting means in the direction opposite the direction of orbital movement of said rotor relative to said freezing surface at a speed such that the portion of said rotor's periphery next to said freezing surface is scraped along said freezing surface in the direction opposite to the direction of translation of the rotor relative to said freezing surface to scour ice therefrom.

2. A flake ice-making machine comprising a cylindrically concave freezing surface, rotating means mounted for rotation about the axis of said cylindrically concave freezing surface and including partition means having a portion generally concentric with the rotative axis of said rotating means and spaced radially outward a substantial distance therefrom, water supply means at the side of said partition means opposite said freezing surface, water jet means connected to said water supply means and disposed relative to said partition means and directed to project sprays of water generally radially of the axis of said freezing surface onto said freezing surface for formation of ice thereon and an ice-removing rotor rotatable relative to said rotating means and having a blade engageable with ice on said freezing surface to shear it from said freezing surface, said partition means including a portion between said water jet means and said ice-removing rotor, and drive means connected to said rotating means and to said rotor for rotating said rotating means relative to said freezing surface and rotating said rotor relative both to said rotating means and to said freezing surface.

3. The flake ice-making machine defined in claim 2, in which the partition means and the water jet means are closer to the freezing surface than to the rotative axis of the rotating means.

4. The flake ice-making machine defined in claim 2, in which the water jet means include a plurality of nozzles spaced apart circumferentially of the freezing surface.

5. The flake ice-making machine defined in claim 4, in which the water jet means includes a plurality of nozzles spaced apart axially of the freezing surface as well as circumferentially of the freezing surface.

6. A flake ice-making machine comprising a concave cylindrical freezing surface, a plurality of nozzles located closer to said freezing surface than to the axis of said freezing surface and directing water spray toward said freezing surface for formation of ice thereon, ice-removing means adjacent to said freezing surface, means operable to rotate said nozzles and said ice-removing means conjointly orbitally relative to said freezing surface, and partition means rotating with said nozzles and said ice-removing means and including a substantially cylindrical arcuate section substantially concentric with and spaced from the axis of said freezing surface but disposed behind said nozzles and substantially radial sections extending between said arcuate section and said freezing surface at opposite sides of said ice-removing means and between said ice-removing means and said nozzles to shield said ice-removing means from spray discharged by said nozzles.

7. A flake ice-making machine comprising a concave cylindrical freezing surface, a plurality of nozzles located closer to said freezing surface than to the axis of said freezing surface and directing water spray toward said freezing surface for formation of ice thereon, a plurality of said nozzles being spaced apart circumferentially of said freezing surface and a plurality of said nozzles being spaced apart axially of said freezing surface, an ice-removing rotor, mounting means rotatable about the axis of said freezing surface and supporting said nozzles and said ice-removing rotor for orbital rotation relative to said freezing surface with said rotor located adjacent to said freezing surface, partition means carried by said mounting means rotatable therewith and including a substantially cylindrical arcuate section substantially concentric with and spaced from the axis of said freezing surface but disposed behind said nozzles and substantially radial sections extending between said arcuate section and said freezing surface at opposite sides of said ice-removing rotor and between said ice-removing rotor and said nozzles to shield said ice-removing rotor from spray discharged by said nozzles, and drive means for rotating said mounting means about the axis of said freezing surface and said rotor about its own axis relative to said rotating mounting means so that the portion of said rotor next to said freezing surface is scraped circumferentially along said freezing surface to scour ice therefrom.

8. A flake ice-making machine comprising a freezing surface cylindrically concave about an upright axis, rotating means mounted for rotation about the axis of said cylindrically concave freezing surface and including arcuate partition means generally concentric with the rotative axis of said rotating means and spaced radially outward a substantial distance therefrom, water supply means at the side of said partition means opposite said freezing surface, water jet means connected to said water supply means and disposed relative to said partition means to project sprays of water onto the lower portion of said freezing surface for formation of ice thereon, additional water supply means adjacent to the top of said freezing surface for flowing a film of water onto and downwardly along the upper portion of said freezing surface, ice-removing means including a rotor rotatable relative to said rotating means, having a blade engageable with ice on said freezing surface to shear it from said freezing surface, and drive means connected to said rotating means and to said rotor for rotating said rotating means relative to said freezing surface and rotating said rotor relative both to said rotating means and to said freezing surface.

9. A flake ice-making machine comprising a freezing surface cylindrically concave about an upright axis, water jet means for projecting sprays of water onto the lower portion of said freezing surface, additional water supply means adjacent to the top of said freezing surface for flowing a film of water onto and downwardly along the upper portion of said freezing surface, ice-removing means, rotary mounting means rotatable about the axis of said freezing surface and supporting said ice-removing means for orbital rotation relative to said freezing surface with said ice-removing means located adjacent to said freezing surface, and drive means for rotating said mounting means about the axis of said freezing surface.

References Cited

UNITED STATES PATENTS

| | | | |
|---|---|---|---|
| 2,064,597 | 12/1936 | Engelmann | 62—354 X |
| 2,812,644 | 11/1957 | Newman | 62—347 |
| 2,860,490 | 11/1958 | Taylor | 62—354 X |

ROBERT A. O'LEARY, *Primary Examiner.*

W. E. WAYNER, *Assistant Examiner.*